United States Patent
Groenewald et al.

(10) Patent No.: US 9,272,779 B2
(45) Date of Patent: Mar. 1, 2016

(54) AIRCRAFT WITH PIVOTING ROTOR MAST

(71) Applicants: Felix Errol Groenewald, Centurion (ZA); David Lucas Groenewald, Centurion (ZA)

(72) Inventors: Felix Errol Groenewald, Centurion (ZA); David Lucas Groenewald, Centurion (ZA)

( * ) Notice: Subject to any disclaimer, the term of this patent is extended or adjusted under 35 U.S.C. 154(b) by 73 days.

(21) Appl. No.: 14/350,326

(22) PCT Filed: Oct. 3, 2012

(86) PCT No.: PCT/ZA2012/000062
§ 371 (c)(1),
(2) Date: Apr. 7, 2014

(87) PCT Pub. No.: WO2013/056275
PCT Pub. Date: Apr. 18, 2013

(65) Prior Publication Data
US 2014/0284419 A1    Sep. 25, 2014

(30) Foreign Application Priority Data
Oct. 12, 2011 (ZA) .................................. 2011/07462

(51) Int. Cl.
| | | |
|---|---|---|
| *B64C 27/52* | (2006.01) | |
| *B64C 27/68* | (2006.01) | |
| *B64C 27/10* | (2006.01) | |
| *A63H 27/133* | (2006.01) | |
| *A63H 27/00* | (2006.01) | |
| *B64C 27/26* | (2006.01) | |
| *B64D 17/80* | (2006.01) | |
| *B64D 27/24* | (2006.01) | |

(52) U.S. Cl.
CPC ............... *B64C 27/52* (2013.01); *A63H 27/12* (2013.01); *B64C 27/10* (2013.01); *B64C 27/26* (2013.01); *B64C 27/68* (2013.01); *B64D 17/80* (2013.01); *B64D 27/24* (2013.01)

(58) Field of Classification Search
CPC ........ B64C 27/12; B64C 27/16; B64C 27/20; B64C 27/32; B64C 27/68; A63H 27/12
See application file for complete search history.

(56) References Cited

U.S. PATENT DOCUMENTS

| | | | |
|---|---|---|---|
| 4,953,811 A | 9/1990 | Smith | |
| 6,182,923 B1 * | 2/2001 | Weinhart | B64C 27/12 244/17.11 |
| 7,032,859 B2 * | 4/2006 | Mohr | B64C 11/001 244/12.2 |
| 7,032,861 B2 * | 4/2006 | Sanders, Jr. | B64C 27/12 244/12.1 |
| 7,249,732 B2 * | 7/2007 | Sanders, Jr. | B64C 27/12 244/12.1 |
| 7,503,747 B2 * | 3/2009 | Ikeda | B64C 27/12 415/229 |
| 7,802,755 B2 | 9/2010 | Poltorak | |
| 8,851,415 B1 * | 10/2014 | Lugg | B64C 27/32 244/17.11 |

(Continued)

FOREIGN PATENT DOCUMENTS

| | | |
|---|---|---|
| CN | 102085912 | 6/2011 |
| WO | 2005072233 | 8/2005 |

*Primary Examiner* — Joseph W Sanderson
(74) *Attorney, Agent, or Firm* — Haugen Law Firm PLLP

(57) ABSTRACT

An aircraft includes two rotors for rotation about a non-rotating rotor mast. The rotors are driven by permanent and/or electromagnets positioned on each of the rotors. A rotor mast joint connecting the rotor mast to a fuselage or wing of the aircraft permits the rotor mast to tilt relative to the fuselage or wing in at least one plane.

22 Claims, 4 Drawing Sheets

(56) References Cited

U.S. PATENT DOCUMENTS

| | | | | |
|---|---|---|---|---|
| 2005/0082421 A1* | 4/2005 | Perlo | ................... | A63H 27/12 244/12.2 |
| 2006/0049304 A1* | 3/2006 | Sanders, Jr. | ............. | B64C 27/12 244/23 A |
| 2006/0060693 A1* | 3/2006 | Poltorak | ................. | B64C 27/10 244/17.11 |
| 2007/0034738 A1* | 2/2007 | Sanders, Jr. | ............. | B64C 27/12 244/23 A |
| 2007/0105475 A1* | 5/2007 | Gotou | ................... | A63H 27/12 446/37 |
| 2008/0240920 A1 | 10/2008 | Ikeda | | |
| 2010/0264258 A1* | 10/2010 | Sirohi | ................... | B64C 27/10 244/17.27 |
| 2011/0147511 A1* | 6/2011 | Poltorak | ................. | B64C 27/10 244/17.19 |

\* cited by examiner

AIRCRAFT WITH PIVOTING ROTOR MAST

BACKGROUND

The present invention relates to an aircraft having a contra-rotating dual rotor system.

Helicopters with contra-rotating rotors are known. For example:
  the Piasecki H-21 helicopter has a horizontal rotor above the cabin and a second horizontal contra-rotating rotor at the tail;
  the Kamov Ka-32A-12 and Ka-52 have co-axial contra-rotating rotors.

Also, many radio controlled toy electric helicopters, such as the Heli-Max Axe Micro CX model helicopter, have co-axial contra-rotating rotors.

Contra-rotating rotors reduce the torque transmitted to the aircraft and dispenses with the need for a tail rotor. This arrangement also neutralises dissymmetry of lift during forward flight, caused by the difference in airflow over the advancing and retreating halves of the rotor blades.

However, a drawback of known co-axial contra-rotating rotor systems is the increased mechanical complexity of the rotor hub, which increases the risk of mechanical faults and failures.

The aircraft according to the present invention aims to addresses the above drawbacks by substituting a rotating rotor mast with a non-rotating rotor mast and enabling the rotor mast to tilt relative to the aircraft.

According to a second embodiment of the invention, there is provided an aircraft having a single rotor and a stator fixed against rotation on a rotor mast, wherein the orientation of the rotor mast relative to the fuselage can be varied in flight.

SUMMARY OF THE INVENTION

According a first embodiment of the present invention there is provided an aircraft including:
  a fuselage or wing;
  a rotor mast;
  first and second rotors spaced axially along, and rotatably connected to the rotor mast;
  an electro magnet on the first rotor;
  one of: (i) an electro magnet, (ii) a permanent magnet; or (iii) an electrically conductive ring, on the second rotor; and
  a rotor mast joint connecting the rotor mast to the fuselage or wing,
wherein the rotor mast joint, in use, permits the rotor mast to tilt relative to the fuselage or wing in at least one plane.

Typically, the flux fields created by the electro magnet on the first rotor and the one of (i) an electro magnet; (ii) a permanent magnet; or (iii) an electrically conductive ring, on the second rotor cause the first and second rotors to counter-rotate.

Generally, the second rotor includes an electrically conductive ring arranged in relation to the electro magnets on the first rotor to provide a linear electric motor. And, the electrically conductive ring is either continuous or made up of ring segments.

Preferably, each rotor includes at least one rotor blade with an aerofoil cross section.

Typically, the permanent magnets, electro magnets and/or electrically conductive ring are located within the inner half-radius of the rotors.

Alternatively, the permanent magnets, electro magnets and/or electrically conductive ring are located at or near the terminal ends of the rotors, distal from the rotor mast.

Optionally, each rotor includes a continuous rotor ring linking the terminal ends of the rotor blades, distal from the rotor mast.

Generally, the outer end of at least one rotor ring extends axially towards the adjacent rotor ring to form a cylindrical section.

Preferably, the outer end of each rotor ring extends axially towards the adjacent rotor ring to form a cylindrical section, and the internal diameter of the cylindrical section of a first rotor ring is greater than the outer diameter of the cylindrical section of a second rotor ring. More preferably, the cylindrical section of the second rotor ring nests within the cylindrical section of the first rotor ring.

Typically, at least a portion of the permanent magnets, electro magnets and/or electrically conductive ring are located on the rotor rings.

Generally, at least a portion of the permanent magnets, electro magnets and/or electrically conductive ring are located on the cylindrical sections.

Preferably, the rotor mast joint permits the rotor mast to tilt in a vertical plane that runs along the major axis of the aircraft. More preferably, the rotor mast joint permits the rotor mast to tilt: (i) in a vertical plane that runs along the major axis of the aircraft; and (ii) a vertical plane that runs along the minor axis of the aircraft.

In one arrangement, the rotor mast joint could permit relative angular movement between the rotor mast and fuselage or wing greater than 0 degrees and less than 25 degrees. In a second arrangement, the rotor mast joint permits relative angular movement between the rotor mast and fuselage or wing greater than 1 degree and less than 25 degrees. In a third arrangement, the rotor mast joint permits relative angular movement between the rotor mast and fuselage or wing greater than 3 degree and less than 25 degrees. In a fourth arrangement, the rotor mast joint permits relative angular movement between the rotor mast and fuselage or wing greater than 3 degrees and less than 25 degrees. In a fifth arrangement, the rotor mast joint permits relative angular movement between the rotor mast and fuselage or wing greater than 4 degrees and less than 25 degrees. And, in a sixth arrangement, the rotor mast joint permits relative angular movement between the rotor mast and fuselage or wing greater than 5 degrees and less than 25 degrees.

Optionally, a parachute is located on the rotor mast above the rotors.

The aircraft could further include a mechanical generator for generating electricity to power rotation of the rotors.

The aircraft is either a helicopter or a toy helicopter.

According to a second embodiment of the present invention, there is provided an aircraft including:
  a fuselage or wing;
  a rotor mast;
  a rotor rotatably connected to the rotor mast;
  permanent magnets, electro magnets and/or an electrically conductive ring on the rotor;
  a stator fixed against rotation on the rotor mast;
  permanent magnets, electro magnets and/or an electrically conductive ring on the stator; and
  a rotor mast joint connecting the rotor mast to the fuselage or wing,
wherein the rotor mast joint, in use, permits the rotor mast to tilt relative to the fuselage or wing in at least one plane.

Typically, in use, the flux fields created by the permanent magnets, electro magnets and/or electrically conductive ring on the rotor and stator cause the rotor to rotate.

Generally, one of the rotor or stator includes electro magnets and the other of the rotor or stator includes an electrically conductive ring arranged in relation to the electro magnets to provide a linear electric motor.

The electrically conductive ring could be continuous. Alternatively, it could be made up of ring segments.

The aircraft is a helicopter or a toy helicopter.

BRIEF DESCRIPTION OF THE DRAWINGS

The invention will now be described in more detail, by way of example only, with reference to the accompanying drawings in which.

Figure 4:
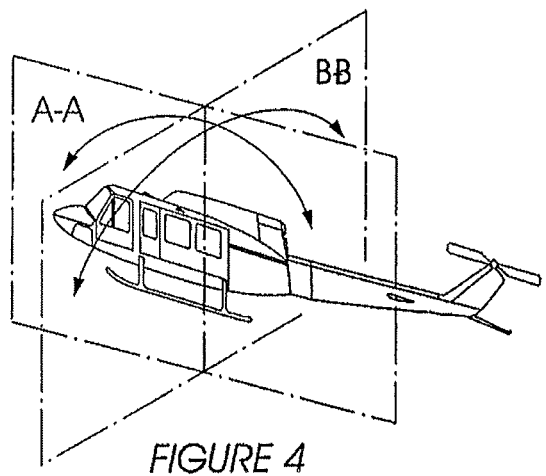
FIG. 4 is an isometric view of a helicopter showing the orientation of planes A-A and B-B.

For the purposes of this specification, the terms:

"Major axis of the aircraft/helicopter" will be interpreted to mean a vertical plane A-A shown in FIG. 4, which travels through the nose and tail of the aircraft/helicopter; and "Minor axis of the aircraft/helicopter" will be interpreted to mean a vertical plane B-B shown in FIG. 4, which travels through the sides of the aircraft/helicopter.

DESCRIPTION OF PREFERRED EMBODIMENTS

Figure 1:
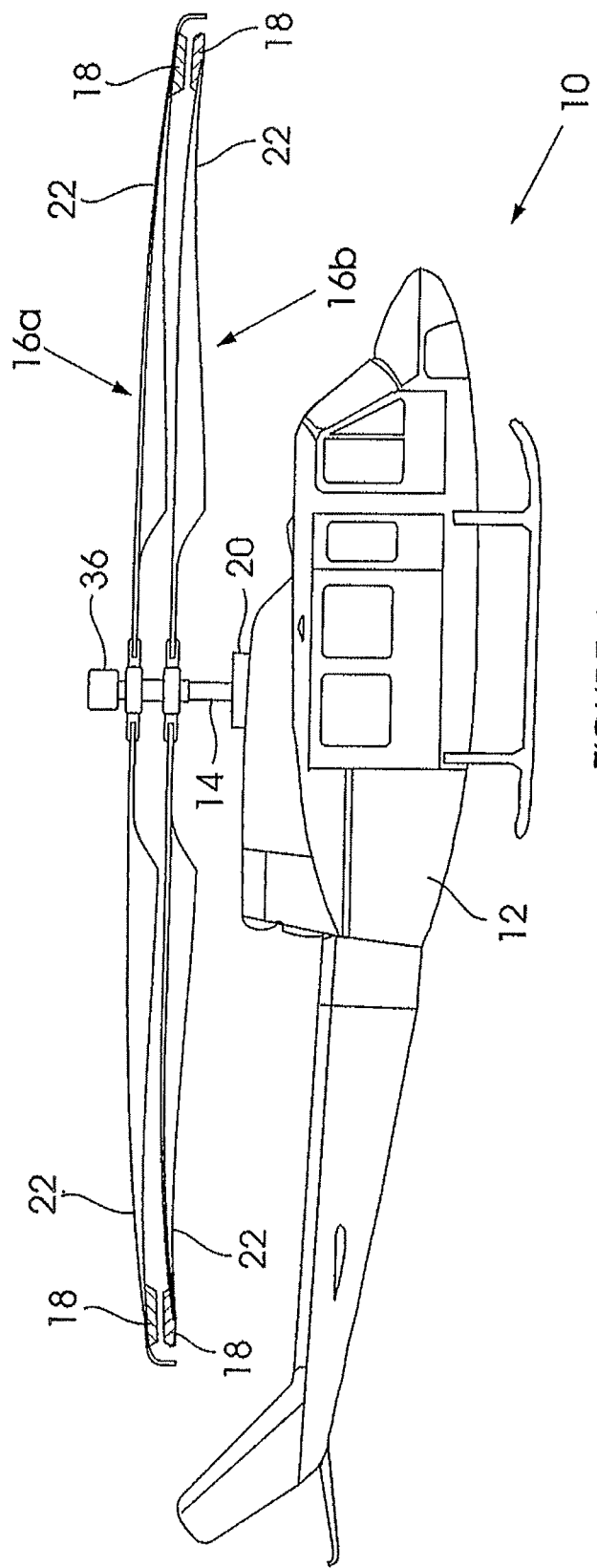
FIG. 1 is a side view of an aircraft according a first embodiment of the present invention.

With reference to FIG. 1 of the drawings, an aircraft 10 according to a first embodiment of the present invention is in the form of a helicopter that includes a fuselage 12, a rotor mast 14, an upper rotor 16a and a lower rotor 16b, permanent and/or electro magnets 18 on each of the rotors 16a and 16b; and a rotor mast joint 20 connecting the rotor mast 14 to the fuselage 12.

The rotors 16a 16b are rotatably connected to the rotor mast 14 and spaced axially along the rotor mast 14. The rotors 16a and 16b and magnets 18 form an electric motor. However, whereas an electric motor would typically have a stator that is fixed against rotation, the stator in this arrangement is freely rotatable about the rotor mast 14 to form the second rotor 16b. Accordingly, when electricity passes through the electromagnets 18, the opposing flux generated between the rotors 16a and 16b cause the rotors to rotate in opposite directions. Since the rotors 16a and 16b are rotatably mounted to the rotor mast 14, the rotor mast 14 remains static despite rotation of the rotors 16a and 16b. In this arrangement, operation and acceleration of the rotors 16a and 16b transfers little or no torque to the rotor mast 14.

The helicopter 10 also includes a mechanical generator (not shown) for generating electricity to drive the rotors 16a and 16b. Alternatively, the electro-magnets 18 could be powered by a battery within the helicopter 10.

Each rotor 16 comprises two rotor blades 22, each rotor blade 22 being connected at one end to the rotor mast 14. Each rotor blade 22 has an aerofoil cross section. In an alternative embodiment (not shown), the rotor blades 22 may be connected to the rotor mast 14 by a hub with control rods to vary the pitch of the rotor blades 22.

Figure 2:
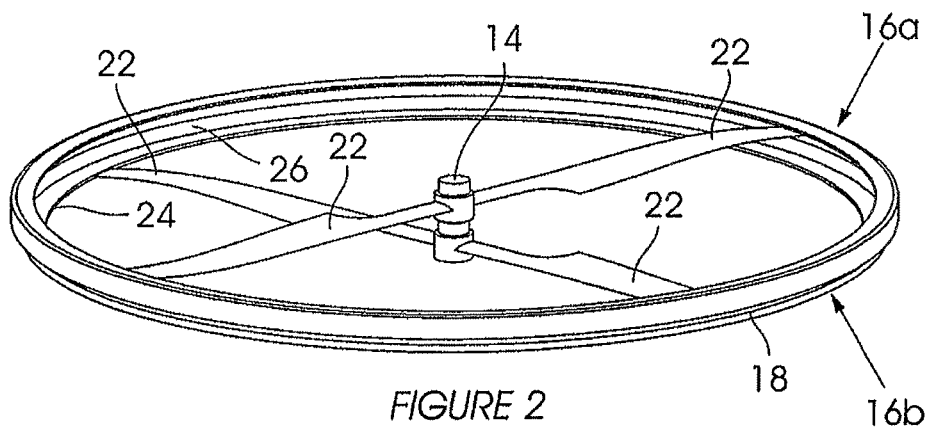
FIG. 2 is an isometric view of a rotor system on the aircraft in FIG. 1.

With reference to FIG. 2, each rotor 16a and 16b includes a continuous ring 24 that connects the terminal ends of the rotor blades 22, distal from the rotor mast 14. And, the perimeter end of the ring 24 on the upper rotor 16a extends axially downwards towards the lower rotor 16b to form a cylindrical section 26. Similarly, the perimeter end of the ring 24 on the lower rotor 16b extends axially upwards towards the upper rotor to form a cylindrical section 26 with an outside diameter that is smaller than the inner diameter of the cylindrical section 26 on the upper rotor al 6a, forming an air gap there between. In this arrangement, the lower rotor 16b nests within the upper rotor 16a.

The greater the displacement between the magnets 18 and the rotor mast 14, the more torque will be applied to the rotors 16a and 16b. Accordingly, the magnets 18 placed on the cylindrical sections 26 will be more efficient than magnets 18 placed on the rings 24, and magnets 18 placed on the rings 24 will, in turn, be less efficient than the magnets 18 placed on the rotor blades 22.

The rotor mast 14 is cylindrical and extends upwards from the fuselage 12. Bearings (not shown) are located between the rotor mast 14 and the rotors 16. Slip rings (not shown) are mounted on the rotor mast 14 proximate the rotors 16a and 16b to provide electric power to the electro-magnets 18 mounted thereon.

Since: (i) rotation of the rotors 16a and 16b does not require rotation of the mast 14, and (ii) drive for the rotors 16a and 16b is generated by the magnets 18 on the rotors 16a and 16b, the rotor mast 14—rotor 16 arrangement (including the rotor hub (not shown)) can be simplified as compared to conventional helicopter systems in which the drive is transferred along the rotating rotor mast 14 and into the rotors 16.

Figure 3:
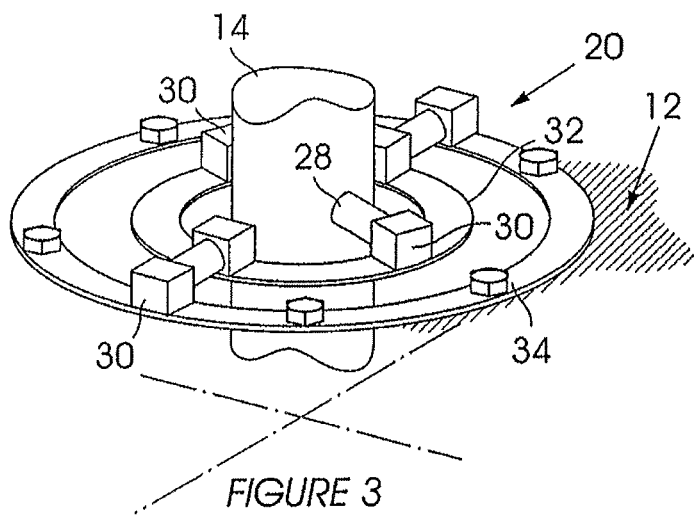
FIG. 3 is an isometric view of a rotor mast joint connecting the rotor mast to the fuselage of the aircraft in FIG. 1.

Turning to FIG. 3, the rotor mast joint 20 connects the rotor mast 14 to the fuselage 12. The rotor mast joint 20 includes a pin 28 that passes diametrically through an aperture in the rotor mast 14 and is connected at its ends to mounts 30. Referring to FIG. 4, the pin 28 permits the rotor mast 14 to tilt: in a vertical plane A-A that runs along the major axis of the helicopter (i.e. the axis that travels through the nose and tail of the helicopter). Reverting back to FIG. 3, the mounts 30 are in turn mounted to a support platform 32 that is pivotally connected to a second support platform 34 in such a manner as to permit the rotor mast 14 to tilt in a vertical plane B-B that runs along the minor axis of the helicopter (i.e. the axis that travels through the sides of the helicopter), as shown in FIG. 4. The second support platform 34 in turn being connected to the fuselage 12.

The rotor mast joint permits relative angular movement between the rotor mast and fuselage greater than 0, 1, 2, 3, 4 or 5 degrees and less than 25 degrees.

The rotor mast joint 20 includes control means (not shown) that control relative tilt in planes A-A and B-B between the rotor mast 14 and the fuselage 12. For pure vertical flight, the rotor mast 14 will be orientated substantially vertically, and for forward flight, the rotor mast 14 will be tilted towards the front of the helicopter 10 (i.e. along plane A-A). To compensate for cross-winds, or for sideways flight, the rotor mast 14 can be tilted to the sides of the helicopter 10 (i.e. along plane B-B).

By providing for a non-rotating rotor mast 14, the mechanism for enabling forward and sideways flight is simplified. And, since the rotor mast 14 can tilt relative to the fuselage 12, the pitch of the blades 22 need not be changed to vary forward and sideways speed. Simplifying the rotor hub (i.e. the connection between the rotor mast 14 and the rotor blades 22) arrangement reduces the number of rotor components and the consequent risk of component failure.

Referring back to FIG. 1, a parachute 36 is located at the top of the rotor mast 14, above the rotors 16*a* and 16*b*. Since the rotor mast 14 does not rotate, the parachute may safely be deployed in flight without entangling with the rotors 16*a* and 16*b* and entwining the parachute cords.

It will be appreciated that the magnets 18 can be arranged on the rotors 16 to create an axial or a radial flux motor or any other type of electric motor. And, the rotors 16*a* and 16*b* could include an arrangement proximal the rotor mast 14 for housing the magnets and generating drive to the rotors 16*a* and 16*b*.

It will also be appreciated that the rotor mast 14 can be connected to a wing of a fixed wing aircraft (similar to the arrangement in an Osprey aircraft).

Figure 5:
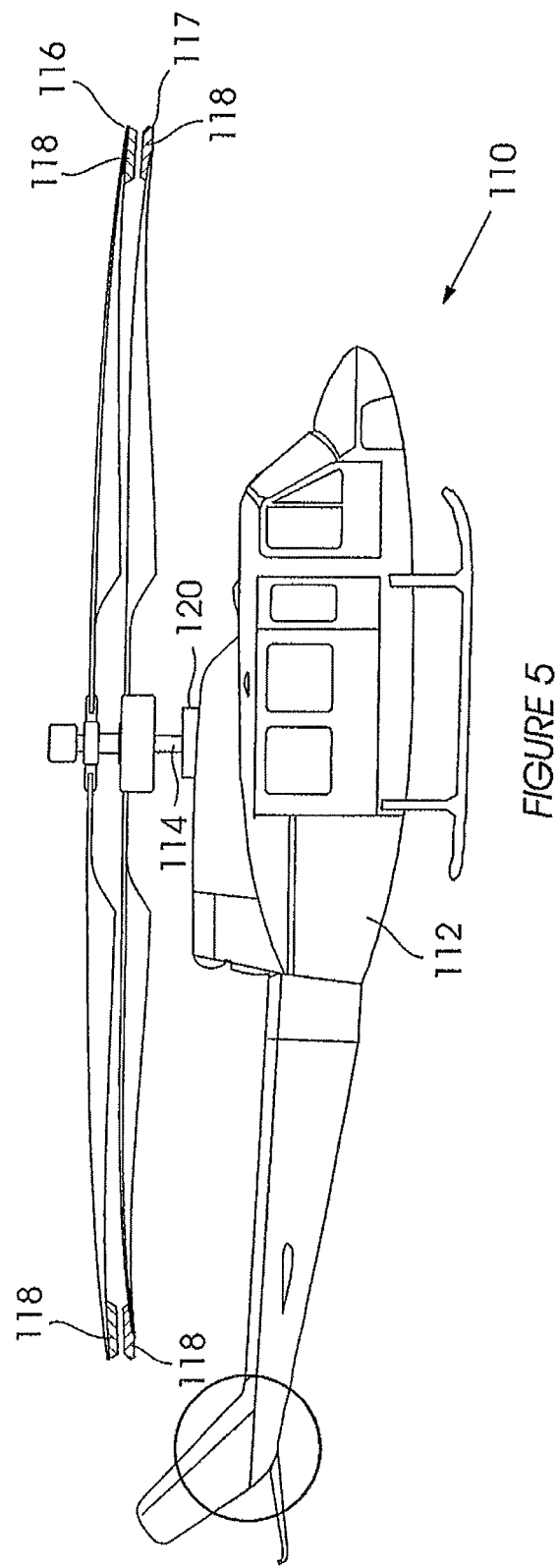
FIG. 5 is a side view of an aircraft according to a second embodiment of the present invention.

A helicopter 110 according to a second embodiment of the invention is shown in FIG. 5. The helicopter 110 includes a fuselage 112, a rotor mast 114, a rotor 116, permanent and/or electro magnets 118 on the rotor 116; a stator 117 fixed against relative rotation to the rotor mast 114; permanent and/or electro magnets 118 on the stator 117; and a rotor mast joint 120 connecting the rotor mast 114 to the fuselage 112.

The rotor 116 and stator 117 with magnets 118 form an electric motor. However, whereas the arrangement according to the first embodiment of the invention transmits no torque to the rotor mast 14, the arrangement according to this second embodiment of the invention transmits torque to the rotor mast 114 and the fuselage 112.

The rotor mast joint 120 is similar to that described in respect of the first embodiment of the invention.

Figure 6:
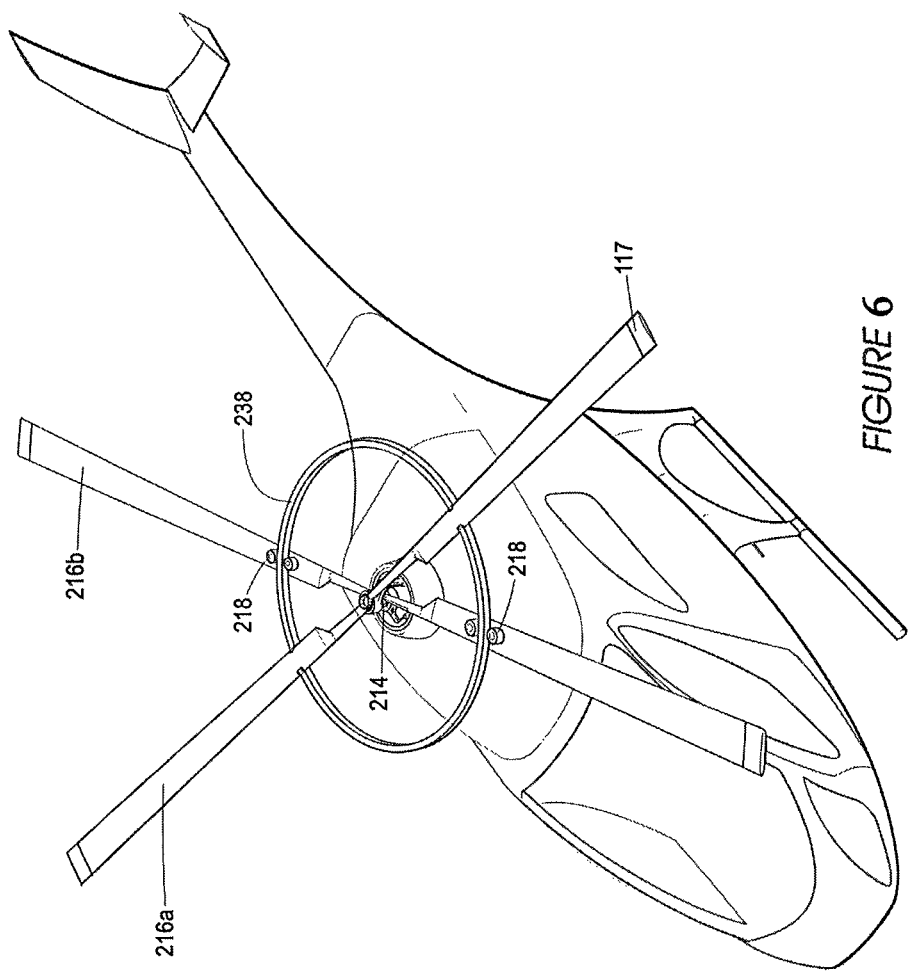
FIG. 6 is a perspective view of a rotor arrangement according to an alternative embodiment of the present invention.

A helicopter according to an alternative embodiment of the invention is shown in FIG. 6. Both upper and lower rotors 216*a* and 216*b* are rotatably mounted to the rotor mast 214 in a similar arrangement as in FIGS. 1 to 4. However, in this embodiment, an electrically conductive ring 238 is secured to the upper rotor 216*a* and electro magnets 218 are located on the lower rotor 216*b*. The electro magnets 218 are located adjacent the electrically conductive ring 238, next to its radial inner and outer surfaces. The electro magnets 218 and electrically conductive ring 238 form a linear electric motor.

The electrically conductive ring 238 is typically made from aluminium.

Although the electrically conductive ring 238 has been shown as a continuous ring, it could alternatively be made of ring segments.

Whereas, the first and second embodiments show the magnets 18 and 118 at the distal ends of the rotors 16, 116 and 117, FIG. 6 shows the electrically conductive ring 238 and electro magnets 218 located nearer to the rotor mast 214, within the inner half-radius of the rotors 216.

It will be appreciated that although all embodiments of the aircraft have been described in the form of a helicopter, the aircraft could be a toy helicopter or any other type of aircraft (including a fixed-wing aircraft) powered by rotor blades.

Furthermore, although the preferred embodiment of the rotor mast joint 20 and 120 has been described, various other arrangements that control tilt of the rotor mast 14 and 114 are possible. And, the rotor mast joint 20 and 120 need not be connected to the fuselage 12 and 112 directly.

The invention claimed is:

1. An aircraft including:
   a fuselage or wing;
   a rotor mast;
   first and second rotors spaced axially along; and rotatably connected to the rotor mast;
   at least one of: (i) an electro magnet, (ii) a permanent magnet; or (iii) an electrically conductive ring, on the second rotor; and
   a rotor mast joint connecting the rotor mast to the fuselage or wing,
   wherein the rotor mast joint, in use, permits the rotor mast to tilt relative to the fuselage or wing in at least one plane.

2. An aircraft according to claim 1, further including an electro magnet on the first rotor.

3. An aircraft according to claim 2, wherein the second rotor includes the electrically conductive ring arranged in relation to the electro magnet on the first rotor to provide a linear electric motor.

4. An aircraft according to claim 2, wherein each rotor includes at least one rotor blade with an aerofoil cross section.

5. An aircraft according to claim 4, wherein at least one of the permanent magnet, electro magnet, and electrically conductive ring is located within the inner half-radius of the second rotor.

6. An aircraft according to claim 5, wherein the rotor mast joint permits the rotor mast to tilt in a vertical plane that runs along a major axis of the aircraft.

7. An aircraft according to claim 5, wherein the rotor mast joint permits the rotor mast to tilt: (i) in a vertical plane that runs along a major axis of the aircraft; and (ii) a vertical plane that runs along a minor axis of the aircraft.

8. An aircraft according to claim 7, wherein the rotor mast joint permits relative angular movement between the rotor mast and fuselage or wing greater than 0 degrees and less than 25 degrees.

9. An aircraft according to claim 7, wherein the rotor mast joint permits relative angular movement between the rotor mast and fuselage or wing greater than 2 degrees and less than 25 degrees.

10. An aircraft according to claim 9, wherein a parachute is located on the rotor mast above the rotors.

11. An aircraft according to claim 7, wherein the rotor mast joint permits relative angular movement between the rotor mast and fuselage or wing greater than 4 degrees and less than 25 degrees.

12. An aircraft according to claim 11, wherein the aircraft is a helicopter or a toy helicopter.

13. An aircraft according to claim 12 including a mechanical generator for generating electricity to power rotation of the rotors.

14. An aircraft including:
    a fuselage or wing;
    a rotor mast;
    a rotor rotatably connected to the rotor mast;
    at least one of permanent magnets, electro magnets, and an electrically conductive ring on the rotor;
    a stator fixed against rotation on the rotor mast;
    at least one of permanent magnets, electro magnets, and an electrically conductive ring on the stator; and
    a rotor mast joint connecting the rotor mast to the fuselage or wing,
    wherein the rotor mast joint, in use, permits the rotor mast to tilt relative to the fuselage or wing in at least one plane.

15. An aircraft according to claim 14, wherein one of the rotor or stator includes electro magnets and the other of the rotor or stator includes the electrically conductive ring arranged in relation to the electro magnets to provide a linear electric motor.

16. An aircraft according to claim 15, wherein the rotor mast joint permits the rotor mast to tilt in a vertical plane that runs along a major axis of the aircraft.

17. An aircraft according to claim 16, wherein the rotor mast joint permits the rotor mast to tilt: (i) in a vertical plane that runs along the major axis of the aircraft; and (ii) a vertical plane that runs along a minor axis of the aircraft.

18. An aircraft according to claim 17, wherein the rotor mast joint permits relative angular movement between the rotor mast and fuselage or wing greater than 0 degrees and less than 25 degrees.

19. An aircraft according to claim 17, wherein the rotor mast joint permits relative angular movement between the rotor mast and fuselage or wing greater than 2 degrees and less than 25 degrees.

20. An aircraft according to claim 19, wherein a parachute is located on the rotor mast above the rotor.

21. An aircraft according to claim 17, wherein the rotor mast joint permits relative angular movement between the rotor mast and fuselage or wing greater than 4 degrees and less than 25 degrees.

22. An aircraft according to claim 20, wherein the aircraft is a helicopter or a toy helicopter.

* * * * *